United States Patent
Fu

(10) Patent No.: US 8,739,640 B2
(45) Date of Patent: Jun. 3, 2014

(54) PULL TEST APPARATUS

(71) Applicant: Wistron Corporation, New Taipei (TW)

(72) Inventor: Zhao-Ping Fu, New Taipei (TW)

(73) Assignee: Wistron Corporation, New Taipei (TW)

( * ) Notice: Subject to any disclaimer, the term of this patent is extended or adjusted under 35 U.S.C. 154(b) by 50 days.

(21) Appl. No.: 13/682,740

(22) Filed: Nov. 21, 2012

(65) Prior Publication Data

US 2014/0109694 A1    Apr. 24, 2014

(30) Foreign Application Priority Data

Oct. 19, 2012   (CN) .......................... 2012 1 0401367

(51) Int. Cl.
| | |
|---|---|
| *G01L 1/26* | (2006.01) |
| *G01L 1/00* | (2006.01) |
| *G01L 5/00* | (2006.01) |
| *G01L 3/00* | (2006.01) |

(52) U.S. Cl.
USPC ............... 73/862.391; 73/862.381; 73/862.08

(58) Field of Classification Search
USPC .......................... 73/862.391, 862.381, 862.08
See application file for complete search history.

(56) References Cited

U.S. PATENT DOCUMENTS

| | | | |
|---|---|---|---|
| 6,227,047 B1 * | 5/2001 | Livingston | ................. 73/379.08 |
| 8,182,426 B2 | 5/2012 | Zhao et al. | |
| 2013/0145855 A1 * | 6/2013 | Liu et al. | ......................... 73/760 |

FOREIGN PATENT DOCUMENTS

CN            203024917 U  *  1/2013

* cited by examiner

*Primary Examiner* — Lisa Caputo
*Assistant Examiner* — Jamel Williams
(74) *Attorney, Agent, or Firm* — Jianq Chyun IP Office

(57) ABSTRACT

A pull test apparatus includes a base, a tension meter and a linkage assembly. An object is adapted to be fixed at the base. The tension meter is movably disposed at the base and adapted to connect a handle of the object. The linkage assembly includes an elastic element and a positioning element. The elastic element is connected between the base and the tension meter. When the tension meter resists the elastic force of the elastic element to move to a first position, the positioning element positions the tension meter. When the positioning element releases the tension meter, the tension meter moves toward a second position by means of the elastic force of the elastic element so as to drive the handle closed at a main body of the object to be unfolded from the main body, wherein the first position is between the object and the second position.

10 Claims, 6 Drawing Sheets

PULL TEST APPARATUS

CROSS-REFERENCE TO RELATED APPLICATION

This application claims the priority benefit of China application serial no. 201210401367.5, filed on Oct. 19, 2012. The entirety of the above-mentioned patent application is hereby incorporated by reference herein and made a part of this specification.

BACKGROUND

1. Field of the Disclosure

The disclosure generally relates to a test apparatus, and more particularly, to a pull test apparatus.

2. Description of Related Art

Benefited from the progress of the semiconductor devices and the display technology, electronic devices continue developing toward direction of small size, versatile functions and easy carrying. The common portable electronic device includes tablet computer and notebook computer. In general, the above-mentioned electronic device has a hard disk therein for users to store data. Taking a notebook computer as an example, in some of the design, a hard disk is disposed at a hard disk fixing structure in a notebook computer, and a handle is disposed on the hard disk fixing structure. The user can make the handle closed at the hard disk fixing structure to fix the hard disk in the notebook computer or make the handle unfolded from the hard disk fixing structure so as to detach and assemble the hard disk conveniently.

In order to firmly close the handle to the hard disk fixing structure and allow the user smoothly pulling the handle, a pull testing is performed on the handle so that the force for unfolding the handle is controlled within a proper range. A conventional pull testing way is make a pull wire (for example, a rope) is used to connect a tension meter to the handle of the hard disk fixing structure, and the tester unarmed applies a force to the tension meter so that the handle under the force is unfolded from the hard disk fixing structure and meanwhile, a displayed reading on the tension meter during unfolding the handle is got. Since such testing way is by means of an unarmed pulling the tension meter by the user, it is hard to keep the force-applying direction, the force amount and the speed of each time close to each other, which affects the accuracy of the testing result.

SUMMARY OF THE DISCLOSURE

Accordingly, the disclosure is directed to a pull test apparatus capable of increasing the accuracy of the testing result.

The disclosure provides a pull test apparatus adapted to perform testing on an object, in which the object includes a main body and a handle, and the handle is configured to be closed to or unfolded from the main body. The pull test apparatus includes a base, a tension meter and at least one linkage assembly. The object is configured to be fixed at the base. The tension meter is movably disposed at the base and configured to be connected to the handle, in which the tension meter is configured to move between a first position and a second position and the first position is between the object and the second position. The linkage assembly includes an elastic element and a positioning element. The elastic element is connected between the base and the tension meter. The positioning element is disposed at the base, in which when the tension meter resists the elastic force of the elastic element to move to the first position from the second position, the positioning element positions the tension meter at the first position, when the positioning element releases the tension meter, the tension meter moves toward the second position by means of the elastic force of the elastic element so as to drive the handle closed at the main body to be unfolded from the main body.

In an embodiment of the disclosure, the pull test apparatus further includes a pull wire, in which the pull wire is connected to the tension meter and the tension meter is configured to be connected to the handle through the pull wire.

In an embodiment of the disclosure, the handle has at least one open hole, the pull wire has at least one hook and the hook is adapted to go through the open hole and locked at the handle.

In an embodiment of the disclosure, the linkage assembly further includes a rail and a slider. The rail is fixed at the base and the slider is fixed at the tension meter and slidably disposed at the rail so that the tension meter is slidably disposed at the base through the slider and the rail.

In an embodiment of the disclosure, the rail has a stopper, and when the slider slides along a direction to drive the tension meter reaching the second position, the stopper prevents the slider from continuously sliding along the direction.

In an embodiment of the disclosure, the positioning element has at least one positioning portion, and when the tension meter is located at the first position, the positioning portion extends into the slider to position the tension meter.

In an embodiment of the disclosure, the rail has at least one slot, and the positioning portion is adapted to enter the rail through the slot and extends into the slider.

In an embodiment of the disclosure, the positioning element is an elastic sheet, when the tension meter is located at the first position, the positioning portion extends into the slider by means of the elastic force of the positioning element; and when the positioning element is pressed by resisting the elastic force of the positioning element, the positioning portion moves away from the slider such that the positioning element releases the tension meter.

In an embodiment of the disclosure, the elastic element is a torsion spring and the linkage assembly further includes a casing, a rack and a gear. The casing is fixed at the slider and encloses the elastic element, in which an end of the elastic element is fixed at the casing to be connected to the tension meter through the casing and the slider. The rack is fixed at the base. The gear is engaged with the rack, in which another end of the elastic element is fixed at the gear to be connected to the base through the gear and the rack, and when the tension meter moves to the first position from the second position, the gear rotates along the rack to drive the elastic element for storing the elastic potential energy.

In an embodiment of the disclosure, the quantity of the at least one linkage assembly is two, the two linkage assemblies are respectively located at opposite two sides of the tension meter, and when the tension meter moves towards the second position by means of the elastic force of the elastic element, the two gears synchronously rotate along the two racks.

Based on the description above, in the pull test apparatus of the disclosure, the elastic element is connected between the tension meter and the base. After the elastic element has elastic potential energy stored therein, the positioning element is used to position the tension meter. In this way, the user merely needs to release the positioning of the positioning element on the tension meter so as to make the tension meter move on the base and pull the handle for performing test by means of the elastic force of the elastic element. After the handle is applied by force to be unfolded from the main body along with the moving of the tension meter, the user can get a reading on the tension meter to accomplish one pull testing. Since the scheme of positioning the tension meter is implemented by the positioning element, the initial positions of the tension meter for testing each time are the same. In the disclosure, the tension meter is driven by the elastic force of the elastic element for action to pull the handle, which is different from the prior art where the user unarmed applies a force to drive the tension meter for pulling the handle, so that the applied force amounts and the speeds for the testing each time are the same or more close to each other, which increases the accuracy of the testing result.

In order to make the features and advantages of the present disclosure more comprehensible, the present disclosure is further described in detail in the following with reference to the embodiments and the accompanying drawings.

DESCRIPTION OF THE EMBODIMENTS

Figure 1A:
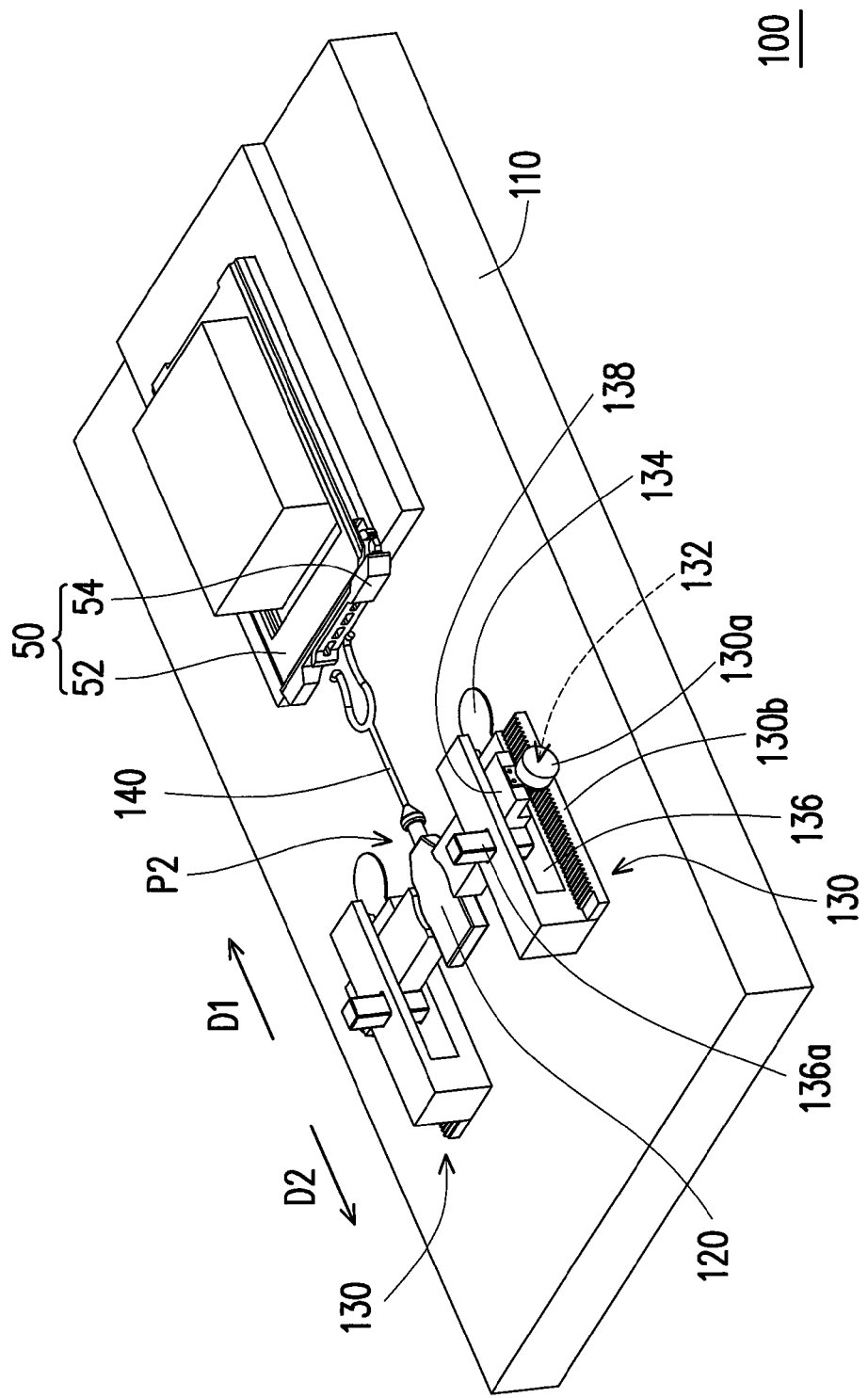
FIGS. 1A-1C are operation flowcharts of a pull test apparatus according to an embodiment of the disclosure.
Figure 1B:
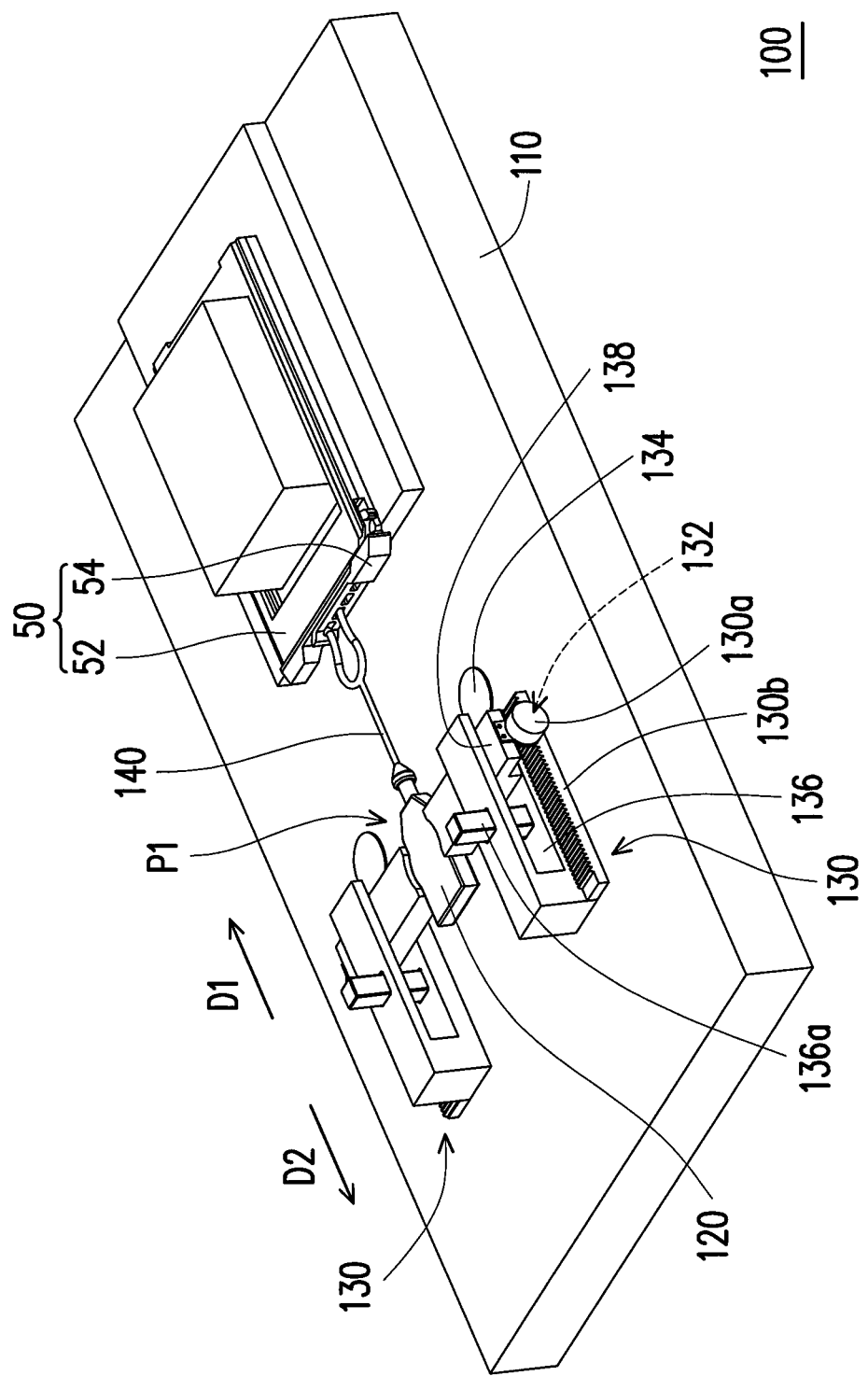
Figure 1C:
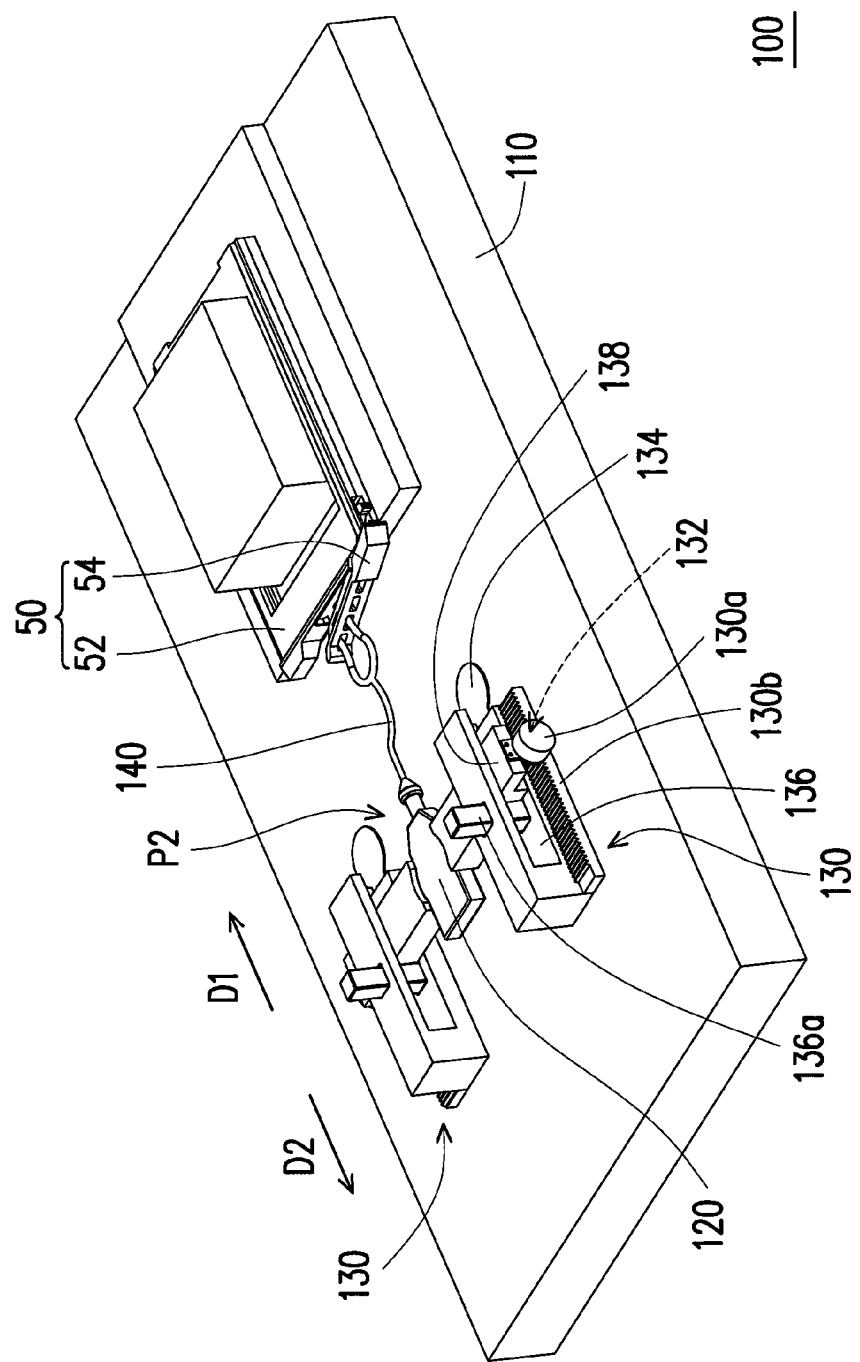

FIGS. 1A-1C are operation flowcharts of a pull test apparatus according to an embodiment of the disclosure. Referring to FIGS. 1A-1C, a pull test apparatus 100 of the embodiment is adapted to perform testing on an object 50. The object 50 is, for example, the hard disk fixing structure article 50 used in an electronic device such as a notebook computer. The hard disk fixing structure article 50 includes a main body 52 and a handle 54. The handle 54 is adapted to be closed at the main body 52 as shown by FIGS. 1A and 1B so as to fix a hard disk in the main body 52 or to unfold the handle 54 from the main body 52 as shown by FIG. 1C to facilitate detaching or replacing the hard disk. In other embodiments, the object 50 can be other appropriate devices with a handle, which the disclosure is not limited to.

The pull test apparatus 100 includes a base 110, a tension meter 120 and at least one linkage assembly 130. The tension meter 120 is movably disposed at the base 110 to be adapted to connect the handle 54. The tension meter 120 is configured to move between a first position P1 as shown by FIG. 1B and a second position P2 as shown by FIGS. 1A and 1C, in which the first position P1 is located between the object 50 and the second position P2. The linkage assembly 130 includes an elastic element 132 and a positioning element 134. The positioning element 134 is disposed on the base 110. The elastic element 132 is connected between the base 110 and the tension meter 120. In the embodiment, the elastic element 132 is hidden in a casing 130a, so the elastic element 132 in FIGS. 1A-1C is marked with hidden lines.

When the user conducts pull testing, first, the object 50 is fixed at the base 110 as shown by FIG. 1A. Next, the tension meter 120 is pulled along a direction D1 so that the tension meter 120 moves to the first position P1 as shown by FIG. 1B from the second position P2 as shown by FIG. 1A against the elastic force of the elastic element 132.

Meanwhile, the tension meter 120 is connected to the handle 54. At the time, the linkage assembly 130 positions the tension meter 120 at the first position P1 and the elastic element 132 gets elastic potential energy stored therein.

When the user allows the positioning element 134 releasing the tension meter 120, by means of the elastic force of the elastic element 132, the tension meter 120 moves towards the second position P2 as shown by FIG. 1C so as to drive the handle 54 closed at the main body 52 to be unfolded from the main body 52.

Under the above-mentioned layout, the pull test apparatus 100 connects the elastic element 132 between the tension meter 120 and the base 110, and after storing the elastic potential energy in the elastic element 132, the positioning element 134 positions the tension meter 120. In this way, the user merely needs to release the positioning of the positioning element 134 on the tension meter 120, the tension meter 120 can move on the base 110 and pull the handle 54 to perform testing by means of the elastic force of the elastic element 132. After the handle 54 is applied by force along with the moving of the tension meter 120 so as to be unfolded from the main body 52, the user can read the reading on the tension meter 120 to accomplish a pull testing. By means of the positioning of the positioning element 134 on the tension meter 120, the initial positions of the tension meter 120 for testing each time are the same. In addition, since the tension meter 120 is driven by the elastic force of the elastic element 132 for action to pull the handle 54, which is different from the prior art where the user unarmed applies a force to drive the tension meter 120 for pulling the handle, so that the applied force amounts and the speeds for the testing each time are the same or more close to each other, which increases the accuracy of the testing result.

Figure 2A:
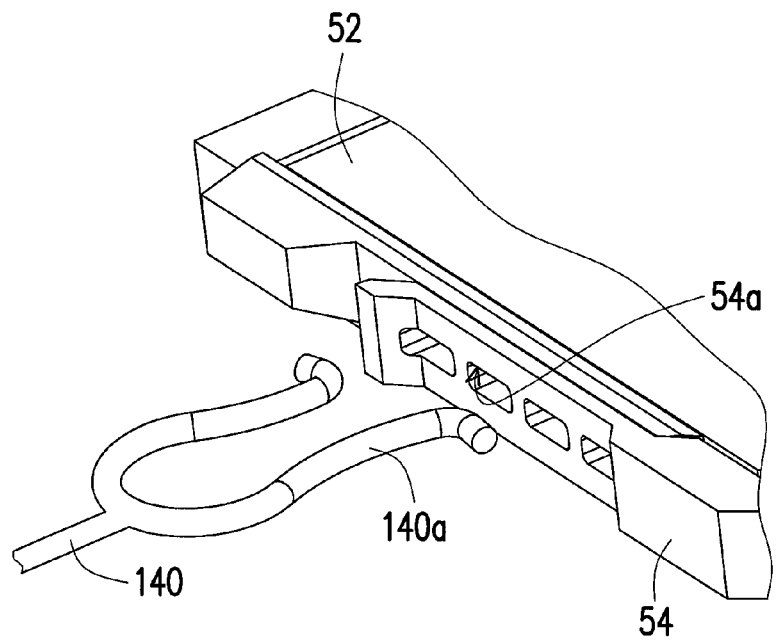
FIGS. 2A and 2B are respectively a partial enlarged diagram of the pull test apparatus in FIGS. 1A and 1B.
Figure 2B:
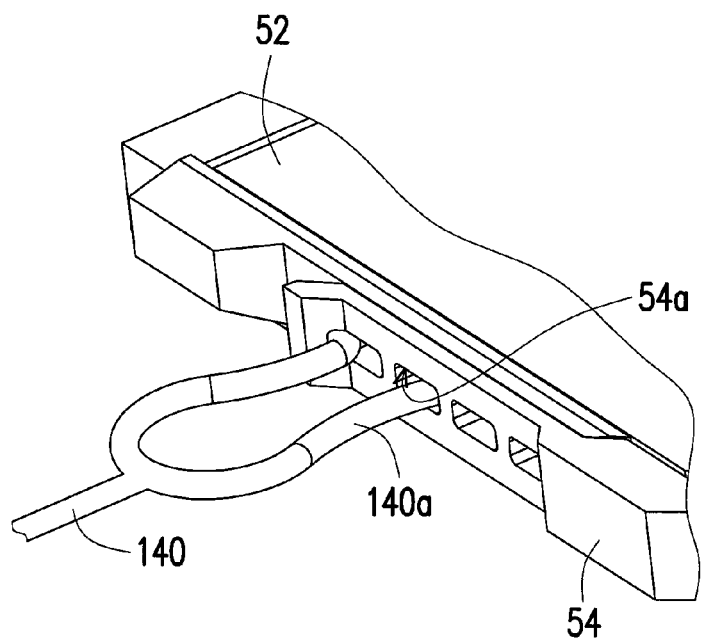

The pull test apparatus 100 in the embodiment further includes a pull wire 140. The pull wire 140 is connected to the tension meter 120 to make the tension meter 120 able to connect the handle 54 through the pull wire 140 as shown by FIG. 1B. FIGS. 2A and 2B are respectively a partial enlarged diagram of the pull test apparatus in FIGS. 1A and 1B. Referring to FIGS. 2A and 2B, in the embodiment, the handle 54 has at least one open hole 54a (multiple holes are shown in the figure). The pull wire 140 has at least one hook 140a (two hooks are shown in the figure). The hook 140a is adapted to go through the open hole 54a and locked at the handle 54 as shown by FIG. 2B. By means of the above-mentioned design of the open hole 54a and the hook 140a, the user can conveniently connect the pull wire 140 to the handle 54. In other embodiments, the pull wire 140 and the handle 54 can be connected to each other with other appropriate ways, which the disclosure is not limited to.

Referring to FIGS. 1A-1C, in the embodiment, the linkage assembly 130 further includes a rail 136 and a slider 138. The rail 136 is fixed at the base 110, and the slider 138 is fixed at the tension meter 120 and movably disposed at the rail 136 to make the tension meter 120 movably disposed at the base 110 through the slider 138 and the rail 136. The above-mentioned design of the rail 136 and the slider 138 can ensure the tension meter 120 moving only along the direction D1 or the direction D2, which makes the force-applying directions for testing each time the same or more close to each other so as to increase the accuracy of the testing result.

In the embodiment, the rail 136 has a stopper 136a. When the slider 138 slides along the direction D2 and drives the tension meter 120 reaching the second position P2 as shown by FIG. 1C, the stopper 136a would prevent the slider 138 from continuously sliding along the direction D2 so as to limit the moving range of the slider 138. The above-mentioned design of the stopper 136a is able to ensure the moving ranges of the tension meter 120 for testing each time the same or more close to each other to increase the accuracy of the testing result.

Figure 3A:
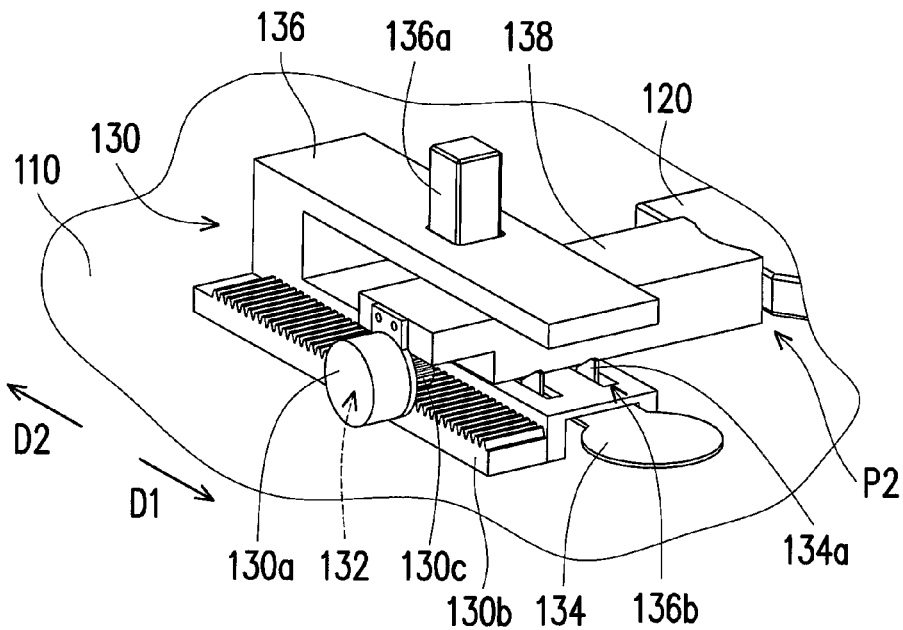
FIGS. 3A and 3B are respectively a partial enlarged diagram of the pull test apparatus in FIGS. 1A and 1B.
Figure 3B:
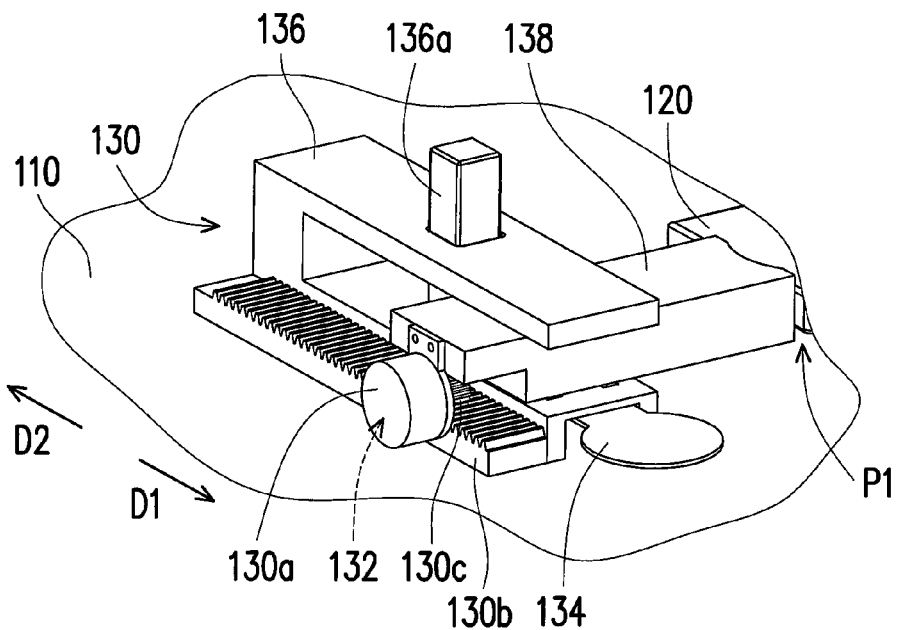

FIGS. 3A and 3B are respectively a partial enlarged diagram of the pull test apparatus in FIGS. 1A and 1B. Referring to FIGS. 3A and 3B, the positioning element 134 in the embodiment is, for example, an elastic sheet and has at least one positioning portion 134a (two ones are shown in the figure). The rail 136 has at least one slot 136b (two ones are shown in the figure). As shown by FIG. 3A, the positioning portion 134a is protruded from the slot 136b by means of the elastic force of the positioning element 134. While the tension meter 120 is moving towards the first position P1 along the direction D1 as shown by FIG. 3B from the second position P2 as shown by FIG. 3A by means of the pulling of the user, the slider 138 resists the elastic force of the positioning element 134 to press down the positioning portion 134a and smoothly reaches the first position P1. Once the tension meter 120 reaches the first position P1 and the positioning portion 134a is aligned with a positioning slot or a positioning hole at the bottom of the slider 138, the positioning portion 134a springs up by means of the elastic force of the positioning element 134 to enter the rail 136 via the slot 136b and extend into the slider 138. In this way, the tension meter 120 is positioned at the first position P1. The user can presses the positioning element 134 against the elastic force of the positioning element 134 to drive the positioning portion 134a and make the positioning portion 134a downwards depart from the slider 138 so that the positioning element 134 releases the tension meter 120. In other embodiments, other appropriate parts can be used to position and release the tension meter 120, which the disclosure is not limited to.

Figure 4:
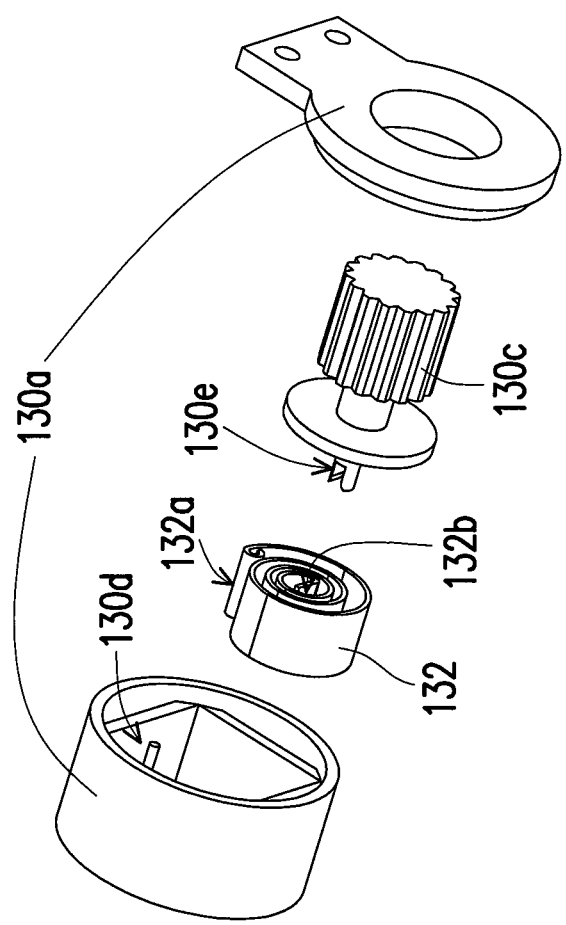
FIG. 4 is an exploded diagram of partial parts of the linkage assembly in FIG. 1A.

FIG. 4 is an exploded diagram of partial parts of the linkage assembly in FIG. 1A. Referring to FIGS. 1A, 3A and 4, in the embodiment, the elastic element 132 is a torsion spring. The linkage assembly 130 further includes a casing 130a, a rack 130b and a gear 130c. The casing 130a is fixed at the slider 138 and encloses the elastic element 132. An end of the elastic element 132 is fixed at the fixing portion 130d of the casing 130a so as to connect the tension meter 120 through the casing 130a and the slider 138. The rack 130b is fixed at the base 110 and the gear 130c is engaged with the rack 130b. Another end of the elastic element 132 is fixed at the fixing portion 130e of the gear 130c so as to connect the base 110 through the gear 130c and the rack 130b. When the tension meter 120 moves to the first position P1 as shown by FIG. 3B from the second position P2 as shown by FIG. 3A, the gear 130c would rotate along the rack 130b along with the moving of the slider 138 and the casing 130a so as to drive the elastic element 132 for storing the elastic potential energy. The above-mentioned design of the gear 130c and the rack 130b can make the elastic element 132 get elastic potential energy stored therein along with the moving of the linkage assembly 130 and the slider 138 to increase the operation convenience of the pull test apparatus 100. When the positioning element 134 releases the tension meter 120 located at the first position P1 and the tension meter 120 thereby moves towards the second position P2 by means of the elastic force of the elastic element 132 and pulls the handle 54, the gear 130c rotates along the rack 130b along with the moving of the slider 138 and the casing 130a. At the time, the elastic element 132 releases the elastic potential energy.

In the embodiment, as shown by FIGS. 1A-1C, the quantity of the linkage assembly 130 is two, and the two linkage assemblies 130 are respectively located at opposite two sides of the tension meter 120. In other words, the elastic element 132, the positioning element 134, the rail 136, the slider 138, the casing 130a, the rack 130b and the gear 130c in FIGS. 3A and 4 are also accordingly and respectively two ones and the above-mentioned parts in pairs are symmetrically located at the opposite two sides of the tension meter 120. When the tension meter 120 moves towards the second position P2 to pull the handle 54 by means of the elastic forces of the two elastic elements 132, the two gears 130c synchronously rotate along the two racks 130b. Meanwhile, the two sliders 138 synchronously slide so that the tension meter 120 gets forces evenly and stably moves along the direction D2.

In summary, in the pull test apparatus of the disclosure, the elastic element is connected between the tension meter and the base. After the elastic element has elastic potential energy stored therein, the positioning element is used to position the tension meter. In this way, the user merely needs to release the positioning of the positioning element on the tension meter so as to make the tension meter move on the base and pull the handle for performing test by means of the elastic force of the elastic element. After the handle is applied by force to be unfolded from the main body along with the moving of the tension meter, the user can get a reading on the tension meter to accomplish one pull testing. Since the scheme of positioning the tension meter is implemented by the positioning element, the initial positions of the tension meter for testing each time are the same. In the disclosure, the tension meter is driven by the elastic force of the elastic element for action to pull the handle, which is different from the prior art where the user unarmed applies a force to drive the tension meter for pulling the handle, so that the applied force amounts and the speeds for the testing each time are the same or more close to each other, which increases the accuracy of the testing result. In addition, the scheme of using the rail and the slider to make the tension meter move and using the stopper on the rail to limit the moving range of the slider can make the force-applying directions and the moving ranges of the tension meter for testing each time the same or more close to each other, which further increases the accuracy of the testing result.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure. The claim scope of the disclosure is defined by the claims hereinafter.

What is claimed is:

1. A pull test apparatus, adapted to perform testing on an object, wherein the object comprises a main body and a handle, and the handle is configured to be closed to or unfolded from the main body, the pull test apparatus comprising:
   a base, wherein the object is configured to be fixed at the base;
   a tension meter, movably disposed at the base and configured to be connected to the handle, wherein the tension meter is configured to move between a first position and a second position and the first position is between the object and the second position; and
   at least one linkage assembly, comprising:
      an elastic element, connected between the base and the tension meter; and
      a positioning element, disposed at the base, wherein when the tension meter resists the elastic force of the elastic element to move to the first position from the second position, the positioning element positions the tension meter at the first position, and when the positioning element releases the tension meter, the tension meter moves toward the second position by means of the elastic force of the elastic element so as to drive the handle closed at the main body to be unfolded from the main body.

2. The pull test apparatus as claimed in claim 1, further comprising a pull wire, wherein the pull wire is connected to the tension meter and the tension meter is configured to be connected to the handle through the pull wire.

3. The pull test apparatus as claimed in claim 2, wherein the handle has at least one open hole, the pull wire has at least one hook and the hook is adapted to go through the open hole and locked at the handle.

4. The pull test apparatus as claimed in claim 1, wherein the linkage assembly further comprises:
   a rail, fixed at the base; and
   a slider, fixed at the tension meter and slidably disposed at the rail so that the tension meter is slidably disposed at the base through the slider and the rail.

5. The pull test apparatus as claimed in claim 4, wherein the rail has a stopper, and when the slider slides along a direction to drive the tension meter reaching the second position, the stopper prevents the slider from continuously sliding along the direction.

6. The pull test apparatus as claimed in claim 4, wherein the positioning element has at least one positioning portion, and when the tension meter is located at the first position, the positioning portion extends into the slider to position the tension meter.

7. The pull test apparatus as claimed in claim 6, wherein the rail has at least one slot, and the positioning portion is adapted to enter the rail through the slot and extends into the slider.

8. The pull test apparatus as claimed in claim 6, wherein the positioning element is an elastic sheet, when the tension meter is located at the first position, the positioning portion extends into the slider by means of the elastic force of the positioning element, and when the positioning element is pressed by resisting the elastic force of the positioning element, the positioning portion moves away from the slider such that the positioning element releases the tension meter.

9. The pull test apparatus as claimed in claim 4, wherein the elastic element is a torsion spring and the linkage assembly further comprises:
   a casing, fixed at the slider and enclosing the elastic element, wherein an end of the elastic element is fixed at the casing to be connected to the tension meter through the casing and the slider;
   a rack, fixed at the base; and
   a gear, engaged with the rack, wherein another end of the elastic element is fixed at the gear to be connected to the base through the gear and the rack, and when the tension meter moves to the first position from the second position, the gear rotates along the rack to drive the elastic element for storing elastic potential energy.

10. The pull test apparatus as claimed in claim 9, wherein quantity of the at least one linkage assembly is two, the two linkage assemblies are respectively located at opposite two sides of the tension meter, and when the tension meter moves towards the second position by means of the elastic force of the elastic element, the two gears synchronously rotate along the two racks.

* * * * *